(12) United States Patent
Anderson

(10) Patent No.: US 11,088,446 B2
(45) Date of Patent: Aug. 10, 2021

(54) DIRECTIONAL ANTENNA WITH SIGNAL STRENGTH FEEDBACK AND METHODS

(71) Applicant: Taoglas Group Holdings Limited, San Diego, CA (US)

(72) Inventor: Christopher M. Anderson, Minneapolis, MN (US)

(73) Assignee: TAOGLAS GROUP HOLDINGS LIMITED, Enniscorthy (IE)

( * ) Notice: Subject to any disclaimer, the term of this patent is extended or adjusted under 35 U.S.C. 154(b) by 0 days.

(21) Appl. No.: 16/678,703

(22) Filed: Nov. 8, 2019

(65) Prior Publication Data

US 2020/0220259 A1    Jul. 9, 2020

Related U.S. Application Data

(63) Continuation of application No. 15/385,194, filed on Dec. 20, 2016, now Pat. No. 10,476,153.

(60) Provisional application No. 62/271,208, filed on Dec. 22, 2015.

(51) Int. Cl.
| | |
|---|---|
| H01Q 3/08 | (2006.01) |
| H04W 24/02 | (2009.01) |
| H04B 17/318 | (2015.01) |
| H04W 16/28 | (2009.01) |

(52) U.S. Cl.
CPC ............ *H01Q 3/08* (2013.01); *H04B 17/318* (2015.01); *H04W 16/28* (2013.01); *H04W 24/02* (2013.01)

(58) Field of Classification Search
CPC .... H01Q 1/1257; H01Q 1/125; H01Q 1/3275; H01Q 3/08; H01Q 3/04; H04B 17/318; H04W 16/28; H04W 24/02

USPC .......................................................... 342/359
See application file for complete search history.

(56) References Cited

U.S. PATENT DOCUMENTS

| | | | |
|---|---|---|---|
| 6,018,646 | A | 1/2000 | Myllymaki et al. |
| 6,542,083 | B1 | 4/2003 | Richley et al. |
| 6,611,696 | B2 | 8/2003 | Chedester et al. |
| 7,005,980 | B1 | 2/2006 | Schmidt et al. |
| 7,696,887 | B1 | 4/2010 | Echavarria |
| 7,764,171 | B2 | 7/2010 | Cheng et al. |
| 8,519,906 | B2 | 8/2013 | Richards et al. |
| 8,615,209 | B1 * | 12/2013 | Khlat ................... H04B 1/0458 455/127.1 |

(Continued)

*Primary Examiner* — Harry K Liu
(74) *Attorney, Agent, or Firm* — Garson & Gutierrez, PC

(57) ABSTRACT

Disclosed are systems and methods for improving the quality and strength of a wireless signal connecting a mobile station and a base station, in situations where the mobile station is able to utilize a directional antenna. The system for improving system quality comprise, for example, a directional antenna; an antenna power level detector which detects a signal strength; a signal inverter wherein the signal inverter generates a conditioned signal from the detected signal strength; an indicator wherein the indicator provides an indicator of a signal quality level from the detected signal strength; a reorientation decision logic wherein the reorientation decision logic communicates an instruction for movement of the directional antenna, wherein the detected signal strength is correlated to a projected orientation of the directional antenna at a time the signal strength is detected, and further wherein an antenna orientation control loop communicates a reorientation instruction for the directional antenna.

16 Claims, 10 Drawing Sheets

(56) References Cited

U.S. PATENT DOCUMENTS

| | | | |
|---|---|---|---|
| 8,750,859 B2* | 6/2014 | Lehser | H04W 24/02 |
| | | | 455/423 |
| 8,892,049 B2 | 11/2014 | Rosenblatt et al. | |
| 8,909,190 B2 | 12/2014 | Carson | |
| 8,947,528 B2 | 2/2015 | Hinman et al. | |
| 8,952,863 B2* | 2/2015 | Haque | H01Q 9/0442 |
| | | | 343/880 |
| 9,000,887 B2 | 4/2015 | Linsky et al. | |
| 9,024,749 B2 | 5/2015 | Ratajczyk | |
| 9,736,846 B1* | 8/2017 | Chukka | H04W 16/26 |
| 2003/0179135 A1* | 9/2003 | Louhi | H01Q 1/1257 |
| | | | 342/359 |
| 2006/0044112 A1 | 3/2006 | Bridgelall | |
| 2006/0052059 A1* | 3/2006 | Hyslop | H01Q 3/005 |
| | | | 455/63.4 |
| 2006/0079304 A1* | 4/2006 | Hyslop | H01Q 3/02 |
| | | | 455/575.7 |
| 2007/0206528 A1* | 9/2007 | Walton | H04W 74/0808 |
| | | | 370/328 |
| 2007/0253395 A1 | 11/2007 | Graves et al. | |
| 2007/0275664 A1* | 11/2007 | Uhl | H04B 7/0837 |
| | | | 455/67.11 |
| 2008/0102813 A1* | 5/2008 | Chari | H04B 7/18506 |
| | | | 455/424 |
| 2014/0192715 A1* | 7/2014 | Tickoo | H04W 40/08 |
| | | | 370/328 |
| 2014/0274094 A1* | 9/2014 | Abdelmonem | H04W 28/0236 |
| | | | 455/452.1 |
| 2016/0191693 A1* | 6/2016 | Zavala | H01Q 21/24 |
| | | | 455/557 |
| 2017/0013534 A1* | 1/2017 | Bellis | H04W 40/16 |
| 2017/0155456 A1* | 6/2017 | Wennerlof | H04W 16/18 |

* cited by examiner

DIRECTIONAL ANTENNA WITH SIGNAL STRENGTH FEEDBACK AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to U.S. patent application Ser. No. 15/385,194, filed Dec. 20, 2016, entitled DIRECTIONAL ANTENNA WITH SIGNAL STRENGTH FEEDBACK AND METHODS, which claims the benefit of U.S. Provisional Application No. 62/271,208, filed Dec. 22, 2015, entitled DIRECTIONAL ANTENNA WITH SIGNAL STRENGTH FEEDBACK AND METHODS, each of which is hereby incorporated herein by reference in its entirety.

All publications, patents, and patent applications mentioned in this specification are herein incorporated by reference to the same extent as if each individual publication, patent, or patent application was specifically and individually indicated to be incorporated by reference. See, for example, US 2006/0044112 A1 published Mar. 2, 2006, to Bridgelall for Wearable RFID Reader and System; US 2007/0253395 A1 published Nov. 1, 2007, to Graves for Wireless Network Detector; US 2007/0275664 A1 published Nov. 29, 2007, to Uhl for Method and System for Improving Wireless Link Performance; U.S. Pat. No. 6,018,646 A issued Jan. 25, 2000, to Myllymaki et al. for Power Consumption Monitor and Alarm for a Mobile Means of Communication; U.S. Pat. No. 6,542,083 B1 issued Apr. 1, 2003, to Richley et al. for Electronic Tag Position Detection Using Radio Broadcast; U.S. Pat. No. 6,611,696 B2 issued Aug. 26, 2003 to Chedester et al. for Method and Apparatus for Aligning the Antennas of a Millimeter Wave Communication Link Using a Narrow Band Oscillator and a Power Detector; U.S. Pat. No. 7,005,980 B1 issued Feb. 28, 2006, to Schmidt for Personal Rescue System; U.S. Pat. No. 7,696,887 B1 issued Apr. 13, 2010, to Echavarria, for Personal Tracking and Communication System; U.S. Pat. No. 7,764,171 B2 issued Jul. 27, 2010, to Cheng et al. for Adjusting a Communications Channel Between Control Unit and Remote Sensor; U.S. Pat. No. 8,519,906 B2 issued Aug. 27, 2013, to Richards et al. for Locating System; U.S. Pat. No. 8,892,049 B2 issued Nov. 18, 2014 to Rosenblatt et al. for Handheld Electronic Devices with Antenna Power Monitoring; U.S. Pat. No. 8,909,190 B2 issued Dec. 9, 2014, to Carson for Portable Wireless Compatibility Detection, Location and Communication Device; U.S. Pat. No. 8,947,528 B2 issued Feb. 3, 2015, to Hinman et al. for Container Classification Identification Using Directional-Antenna RFID; U.S. Pat. No. 9,000,887 B2 issued Apr. 7, 2015 to Linsky et al. for Method and Apparatus for Communicating Control Information by a Wearable Device to Control Mobile and Consumer Electronic Devices; and U.S. Pat. No. 9,024,729 B2 issued May 5, 2015 to Ratajczyk for Tactile and Visual Alert Device Triggered by Received Wireless Signals.

BACKGROUND

In many modern communication systems, a directional antenna from a mobile station aimed directly at a base station provides the highest quality signal, which directly relates to the data rate which can be achieved. The antenna gives the wireless system three fundamental properties: gain (measure of an increase in power, typically expressed as dB), direction (the shape of the transmission pattern), and polarization. As the gain of a directional antenna increases the angle of radiation usually decreases. This can provide greater coverage distance, but with a reduced coverage angle. The changes in gain, direction and polarization also impact the strength of the signal. Because directional antennas focus RF energy in a particular direction, as the gain of a directional antenna increases, the coverage distance increases but the effective coverage angle decreases.

To point a directional antenna in the absence of prior knowledge of the location/direction of the other end of the radio link requires using a measuring receiver circuit to measure incident signal strength from the desired transmitter. By using active power control, software on the cellular base station attempts to ensure that all the incoming signals from the mobile stations are at approximately the same strength. This is achieved by the base station measuring each received signal and implementing a control loop that sends power control instructions to the mobile station to transmit more or less power. This control loop is updated continuously during a connection.

A key impediment to achieving an optimal signal for maximum data rate is that there is no direct way to determine the position of the base station relative to the mobile station and hence an optimal alignment of the directional antenna for achieving optimal signal quality and highest data throughput. Instructions to the mobile station to transmit more or less power may not achieve an optimal received signal. What is needed is a system and device for exploiting an existing mechanism of modern wireless communication systems which observes a current signal strength and can then reorient the direction antenna, noting the inferred signal strength at each successive orientation, until a satisfactory signal strength is achieved.

SUMMARY

By exploiting a mechanism of modern wireless communication systems, namely active power control, the disclosed system can operate independent of any radio attached to an antenna and infer and then communicate an antenna alignment to either a human operator or an automated control system. The operator or automated control system, observing the current signal strength can then reorient the direction of the antenna, noting the inferred signal strength at each successive orientation, until a satisfactory signal strength is achieved. Reorienting the antenna can occur by changing at least one of a pitch, yaw or roll of, for example, a joint associated with the antenna, and thus a position of the antenna.

Disclosed are systems for improving the quality and strength of a wireless signal connecting a mobile station and a base station, in situations where the mobile station is able to utilize a directional antenna. Antennas are external.

Systems are configurable to use an indirect method to measure alignment of a directional antenna to a base station. This alignment measure can be used for manually, automatically or semi-automatically realigning the directional antenna to an orientation which provides an increased signal reception by the base station. Systems are configurable to utilize an aspect of the existing signal power feedback loop employed in many modern wireless communication systems.

An antenna power feedback loop can also be provided as part of a closed control system formed by a mobile station antenna and a base station. To ensure incident signals arriving on the base station antenna have a similar or equal signal strength, the base station sends feedback to signaling devices on the strength of signal received. The power levels can vary widely when the control look is struggling. However, under normal operation the base station will typically keep all the handsets within 2 dB or so of the same power level as measured at the base station antenna. A user can rotate the directional antenna. When the antenna is pointed at the base station, the base station will communicate with the attached radio to turn the power down. As disclosed, a visual indicator (such as LED lights) can be activated to provide the user with feedback to reflect the power change. Suitable signals would be any signal that operates under, for example, the CDMA2000 or 3GPP standards. In at least some configurations, the power control loop updates every 200 ms (+/−5-50 ms) so that the user received feedback very quickly.

A specific feedback signal from the base station to the mobile station may not be directly discernable. The system, is configurable to utilize a method to indirectly infer the nature of the alignment of the antenna to the base station.

While the feedback from the base station may not be directly determined in at least some configurations, the resulting power supplied to the external directional antenna can be measured. The disclosed system provides power to an external directional antenna connected to a mobile station which can be measured as an indicator of antenna alignment.

Once the antenna power is measured, the signal corresponding to power level can be conditioned in such a way that a manual operator can see, hear or feel an indication for the power level corresponds to an antenna orientation. In this way, by seeing direct sensory feedback from any antenna orientation, a manual operator can physically move the antenna through one or more degrees of freedom until the operator is satisfied with an orientation producing a suitable power level.

Just as a manual operator can note the power level and adjust orientation, so too could an automation module which could receive a conditioned signal and via an algorithm driving actuators automatically move the antenna through a pre-designed search algorithm to arrive at a power level which meets a previously defined criteria.

An aspect of the disclosure is directed to a system for improving signal quality. The system for improving system quality comprises: a directional antenna; an antenna power level detector which detects a signal strength; a signal inverter wherein the signal inverter generates a conditioned signal from the detected signal strength; an indicator wherein the indicator provides an indicator of a signal quality level from the detected signal strength; a reorientation decision logic wherein the reorientation decision logic communicates an instruction for movement of the directional antenna, wherein the detected signal strength is correlated to a projected orientation of the directional antenna at a time the signal strength is detected, and further wherein an antenna orientation control loop communicates a reorientation instruction for the directional antenna. The system can also include an automatic actuator subsystem to realign an orientation of the directional antenna. The automatic actuator subsystem can operate automatically or semiautomatically. Additionally, the reorientation instruction can be implemented by an automatic actuator subsystem. In some configurations, drive actuators are provided which are configured to reorient the directional antenna as part of a closed loop. One or more reorientation instructions can be provided which are communicated for the directional antenna until the detected signal strength reaches a threshold value. The system can also be configured to connect to a mobile computing device. Instructions for movement of the directional antenna can also be provided to a user.

Another aspect of the disclosure is directed to a system for improving signal quality when used in a cellular transmit power control loop controlled by a cellular base station, Systems comprise: a directional antenna connected to a desktop cellular router as an external antenna; an antenna power level detector which detects a signal strength; a signal inverter wherein the signal inverter generates a conditioned signal from the detected signal strength; an LED indicator further comprising a series of parallel LED bars externally visible to indicate signal quality level an indicator wherein the LED indicator provides an indication of a signal quality level from the detected signal strength; a reorientation decision logic wherein the reorientation decision logic communicates an instruction for movement of the directional antenna, wherein the detected signal strength is correlated to a projected orientation of the directional antenna at a time the signal strength is detected, and further wherein an antenna orientation control loop communicates a reorientation instruction for the directional antenna. Additionally, an automatic actuator subsystem to realign an orientation of the directional antenna. The reorientation instruction is implemented by an automatic actuator subsystem either automatically or semiautomatically. Drive actuators can be provided which are configured to reorient the directional antenna as part of a closed loop. Additionally, the one or more reorientation instructions are communicated for the directional antenna until the detected signal strength reaches a threshold value. Additionally, the system is configurable to be connected to a mobile computing device. In some configurations instruction for movement of the directional antenna can be provided to a user.

Still another aspect of the disclosure is directed to a method for improving signal quality of a directional antenna when used in a transmit power control loop. The method can comprise: detecting an signal strength from a directional antenna; inverting the detected signal via a signal inverter wherein the signal inverter; generating a conditioned signal from the detected signal strength; indicating a signal quality level from the detected signal strength; communicating a reorientation decision from a reorientation decision logic for movement of the directional antenna, wherein the detected signal strength is correlated to a projected orientation of the directional antenna at a time the signal strength is detected, and further wherein an antenna orientation control loop communicates a reorientation instruction for the directional antenna. In some configurations, the method further comprises automatically realigning an orientation of the directional antenna via an actuator subsystem. Additionally, the steps of detecting, inverting, generating, indicating and communicating are repeated, e.g. in a loop, until the detected signal strength reaches a threshold value. Additionally, the method can comprise the step of connecting the system to a mobile computing device. In some configurations, the method includes instructing a user to move the directional antenna.

Yet another aspect of the disclosure is directed to a system for improving signal quality when used in a transmit power control loop. The system comprises: a directional antenna means; an antenna power level detector means which detects a signal strength; a signal inverter means wherein the signal inverter means generates a conditioned signal from the detected signal strength; an indicator means wherein the indicator means provides an indicator of a signal quality level from the detected signal strength; a reorientation decision logic means wherein the reorientation decision logic means communicates an instruction for movement of the directional antenna means, wherein the detected signal strength is correlated to a projected orientation of the directional antenna means at a time the signal strength is detected, and further wherein an antenna orientation control loop communicates a reorientation instruction for the directional antenna. In some configurations, the system includes an automatic actuator subsystem means to realign an orientation of the directional antenna means. Additionally, the reorientation instruction is implemented by an automatic actuator subsystem means. Drive actuators means can also be provided which are configured to reorient the directional antenna means as part of a closed loop. One or more reorientation instructions can be communicated for the directional antenna means until the detected signal strength reaches a threshold value. In some configurations, the system is connected to a mobile computing device means. Instruction for movement of the directional antenna means can provided to a user.

Still another aspect of the disclosure is directed to a machine readable medium containing instructions that, when executed by a computing device, cause the computing device to perform a method. The method performed by the machine readable medium comprises: detecting an signal strength from a directional antenna; inverting the detected signal via a signal inverter wherein the signal inverter; generating a conditioned signal from the detected signal strength; indicating a signal quality level from the detected signal strength; communicating a reorientation decision from a reorientation decision logic for movement of the directional antenna, wherein the detected signal strength is correlated to a projected orientation of the directional antenna at a time the signal strength is detected, and further wherein an antenna orientation control loop communicates a reorientation instruction for the directional antenna. In some configurations, the method further comprises automatically realigning an orientation of the directional antenna via an actuator subsystem. Additionally, the steps of detecting, inverting, generating, indicating and communicating are repeated, e.g., in a loop, until the detected signal strength reaches a threshold value. Additionally, the system can be configured to connect the system to a mobile computing device. In some configurations, instructions are provided to a user to move the directional antenna.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings, where:

DETAILED DESCRIPTION

As will be appreciated by those skilled in the art, the strength of a received signal at a base station is influenced by numerous factors including the conducted transmit power in the mobile station, which is set by instructions sent from the base station, and the antenna performance. A directional antenna focuses radiates or receives greater power in specific directions, which allows for increased performance and reduced interference from unwanted sources. However, when a directional antenna on a mobile station is pointed away from the base-station, the signal received at the base station is lower than the signal would be if the directional antenna were pointed towards the base station. In this scenario, current solutions provide that the power control loop on the base station instructs the mobile station to increase its conducted transmit power to result in an improved signal. If the directional antenna is pointed at the base-station, there will be an increase in the signal strength from the antenna at the base station, which will causing the base station to instruct the mobile station to lower its transmit power.

Figure 1A:
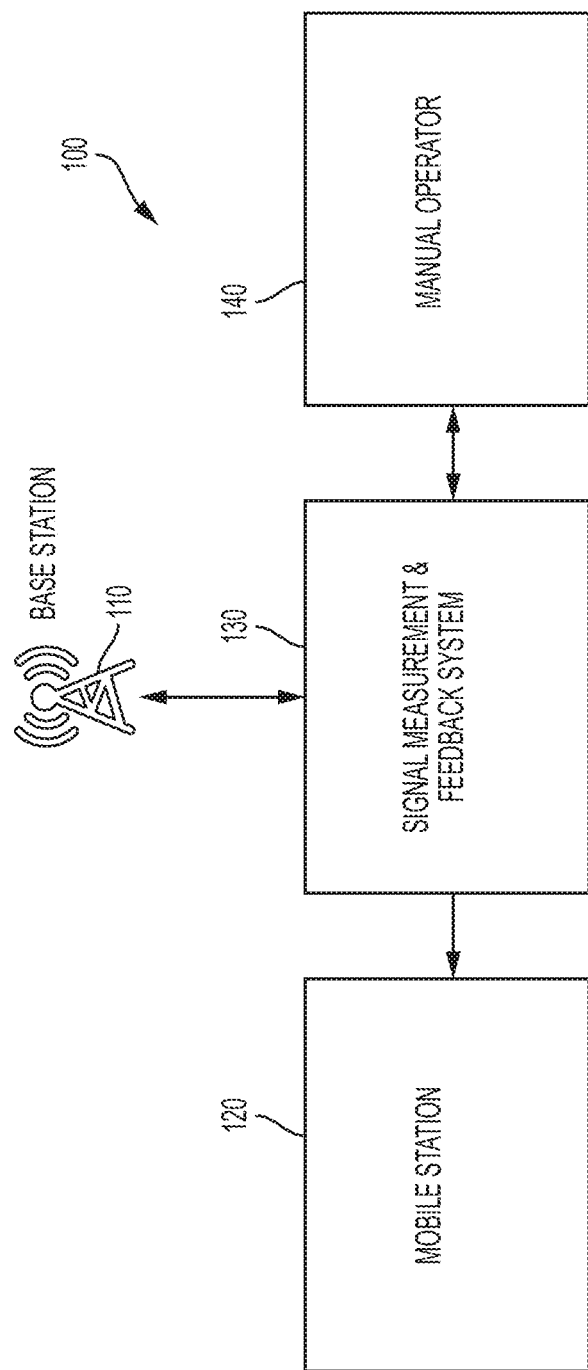
FIG. 1A and FIG. 1B are system-level block diagrams of manual and automated antenna reorientation schemes.
Figure 1B:
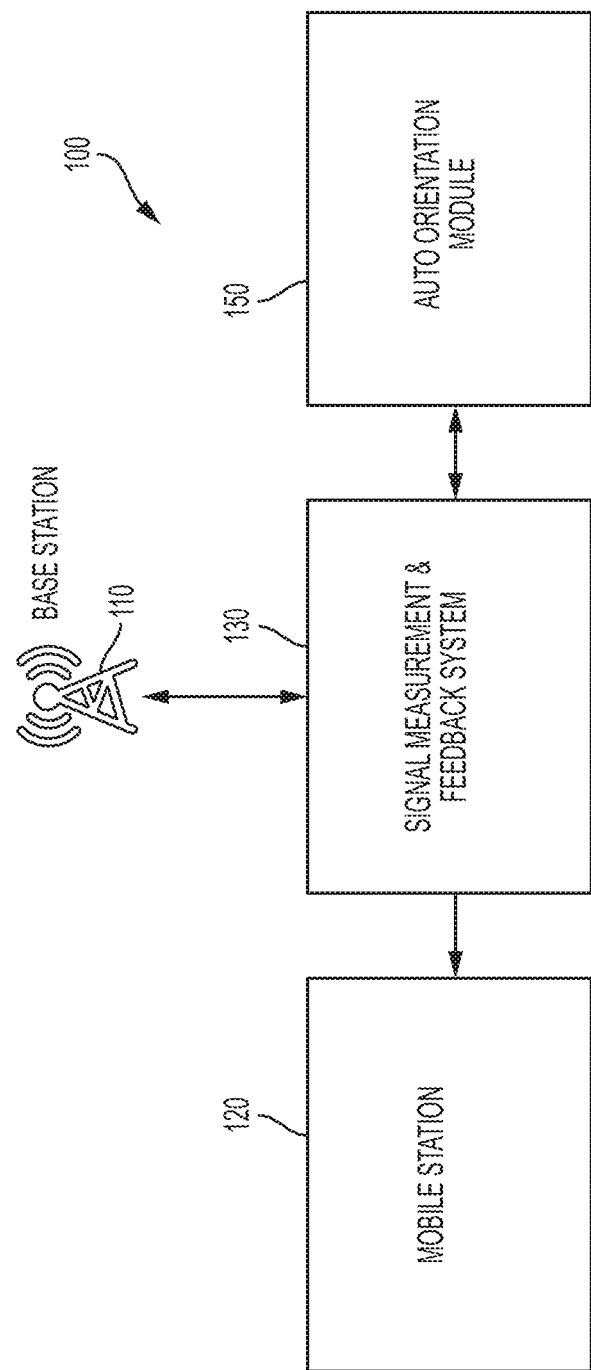

Referring now to FIG. 1A and FIG. 1B, a high level block diagram of a system 100 is provided. The diagram illustrates electronic and electro-mechanical sub-systems of an exemplary signal alignment mechanism, where a signal power from an external directional antenna having a signal measurement and feedback system 130 is connected to a mobile station 120. The signal is measured and relayed to a human (manual operator 140) or automatic module (auto orientation module 150) to reorient the directional antenna with an aim to improve signal quality received by a base station 110.

The high-level block diagram of FIG. 1A illustrates an exemplary signal alignment mechanism, whereby the signal strength feedback from a base station 110 is relayed to a manual operator 140 via a signal measurement and feedback system 130 connected to a mobile station 120. For example a desktop cellular router or cellular handset can be configured to be in communication with an external directional antenna.

In the depicted configuration, an external communication tower, can be provided which is located at an arbitrary geographic location which is unknown to the manual operator. The external communication tower, relays one or more data packets to and from a plurality of mobile stations in a predefined scheme in accordance with a closed loop power control configuration typical of many modern wireless communication systems.

The transmit power level provided to the antenna can be sensed by the signal measurement and feedback system 130. The signal measurement and feedback system 130 can further comprise multiple sub-systems. As shown in FIG. 1A, the signal measurement and feedback system 130 detects a transmit power level provided to the base station 110 from the mobile station 120. This transmit power level is communicable to a human operator by any of a plurality of sensory mechanisms. The human operator, or manual operator 140, is then able to determine if the presently received signal is satisfactory (i.e., has an adequate strength) and if not, decide how to adjust the system 100 accordingly.

FIG. 1B demonstrates a similar configuration with a base station 110 in a closed transmit power control loop with the mobile station 120 via a signal measurement and feedback system 130. In this configuration, the signal measurement and feedback system 130 is configurable to form a secondary closed loop with an auto orientation module 150 which is configurable to automate the role of the manual operator shown in FIG. 1A, by electronically reacting to the received signal power level by implementing any number of algorithms to adjust the communications system accordingly.

Figure 2:
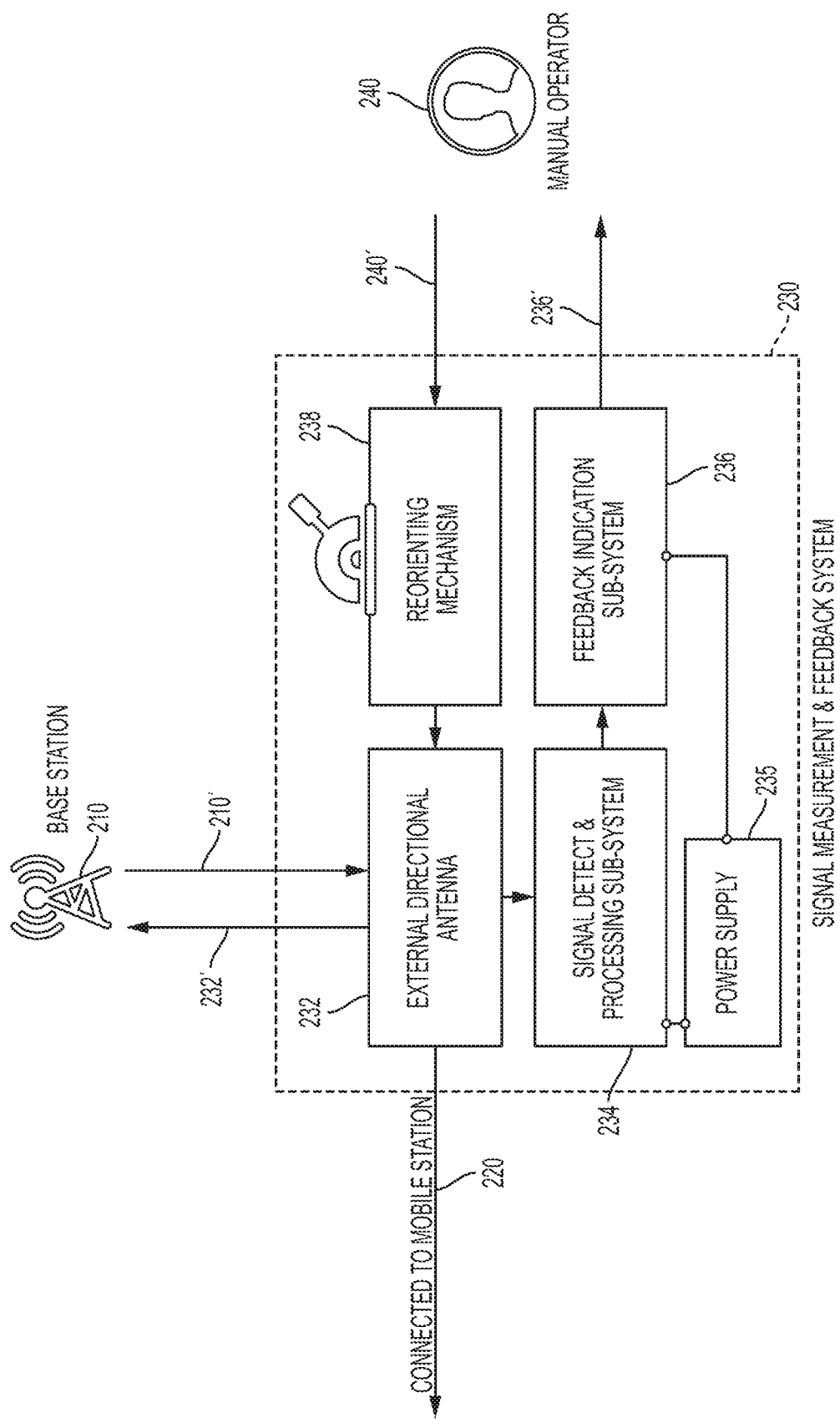
FIG. 2 is sub-system level schematic of manual feedback and adjustment configuration detailing a signal measurement and feedback system.

Turning to FIG. 2, the base station 210 provides incident signal power level feedback 210' to the external directional antenna 232 of the signal measurement and feedback system 230. An external directional antenna 232, which is connectable electrically via a signal line cord to a mobile station 220, is configurable to function as an external directional antenna. The external directional antenna 232 may be any suitable directional antenna, and further may comprise a signal line cord engaged with a radiating element of the antenna which radiates or receives greater power in a specific, configurable direction allowing for increased performance and reduced interference from unwanted sources. Mechanically the radiating element of the antenna is fixable to an articulated joint which is able to move radially through one or more degrees of freedom (pitch-yaw-roll). The other end of the antenna is able to move with freedom to point in any direction the articulated joint, and mechanical constraints, permit. The external directional antenna 232 therefore functions as the antenna of the mobile station 220, transmitting and receiving data signals 232' to and from the base station 210 to mobile station 220 and receiving updated power level feedback from base station 210 as part of a power control loop.

The incident signal power level feedback 210' received by the external directional antenna 232 is detected and processed by the signal detect and processing subsystem 234. Line input for the signal detect and processing subsystem 234 initiates from a detector component in proximity to and coupled with the external directional antenna 232. One configuration implements signal processing functionality via a microcontroller having a set of predefined algorithms to implement each processing module. After processing, a conditioned signal leads into the feedback indication subsystem 236. In one configuration, antenna power level detects signal strength via a directional coupler, which imparts a signal which can then be conditioned by way of inversion and normalization, where required, into a form which can readily be used by systems comprising at least one of feedback indication sub-system or an auto-orientation module.

A power supply 235 is provided. A power supply 235 includes, for example, a battery or a lead from externally power supply provides DC power into signal detect and processing subsystem 234 and feedback indication subsystem 236.

The feedback indication subsystem 236 comprises any permutation of visual, auditory or electromechanical indicators which are configurable to provide an indication that represents the current suitability of the orientation of the external directional antenna 232, such that indicators can, in some configurations, be sensed 236' by a manual operator 240. The feedback indication subsystem 236 is configurable to receive a conditioned signal from signal detect and processing subsystem 234, which engages an internal driver configured to drive one or more indicators. Indicators may be any number of a plurality of sensory indicators including visual displays, LEDs of varying illumination and color, auditory indicators, modes of vibration or other electromechanical indications, and may be implemented in some configurations via an external mobile device comprising one of a tablet, mobile phone, portable computer or other mobile device capable of providing suitable indication to a human operator. One configuration includes a series of parallel light emitting diode (LED) 'bars' calibrated to all light up at once when directional antenna alignment to base station is strongest (that is, when base station instructs the directional antenna power signal to transmit at its weakest level).

The manual operator 240 is a human operator able to sense feedback 236' from the feedback indication subsystem 236 and also physically access either reorienting mechanism 238 or external directional antenna 232 directly, to reorient provide input 240' to the reorienting mechanism 238 to reorient the external directional antenna 232 as desired. The manual operator 240 judges power level from observations of indicators of the feedback indication subsystem 236 and adjusts directional antenna orientation with the aim of maximizing the indicator readings observed in the feedback indication subsystem 236.

Some configurations of the system are configurable to provide mechanical assistance in providing additional turning force or accuracy, to physically reorient the external directional antenna 232. If used, such a reorienting mechanism 238 can be physically accessible to the manual operator 240 who controls the mechanism, which in turn physically drives one or more degrees of freedom in reorienting the external directional antenna. The reorienting mechanism may comprise components including gears, levers, hydraulics, pneumatics or other assistive facility to reorient directional antenna.

Figure 3:
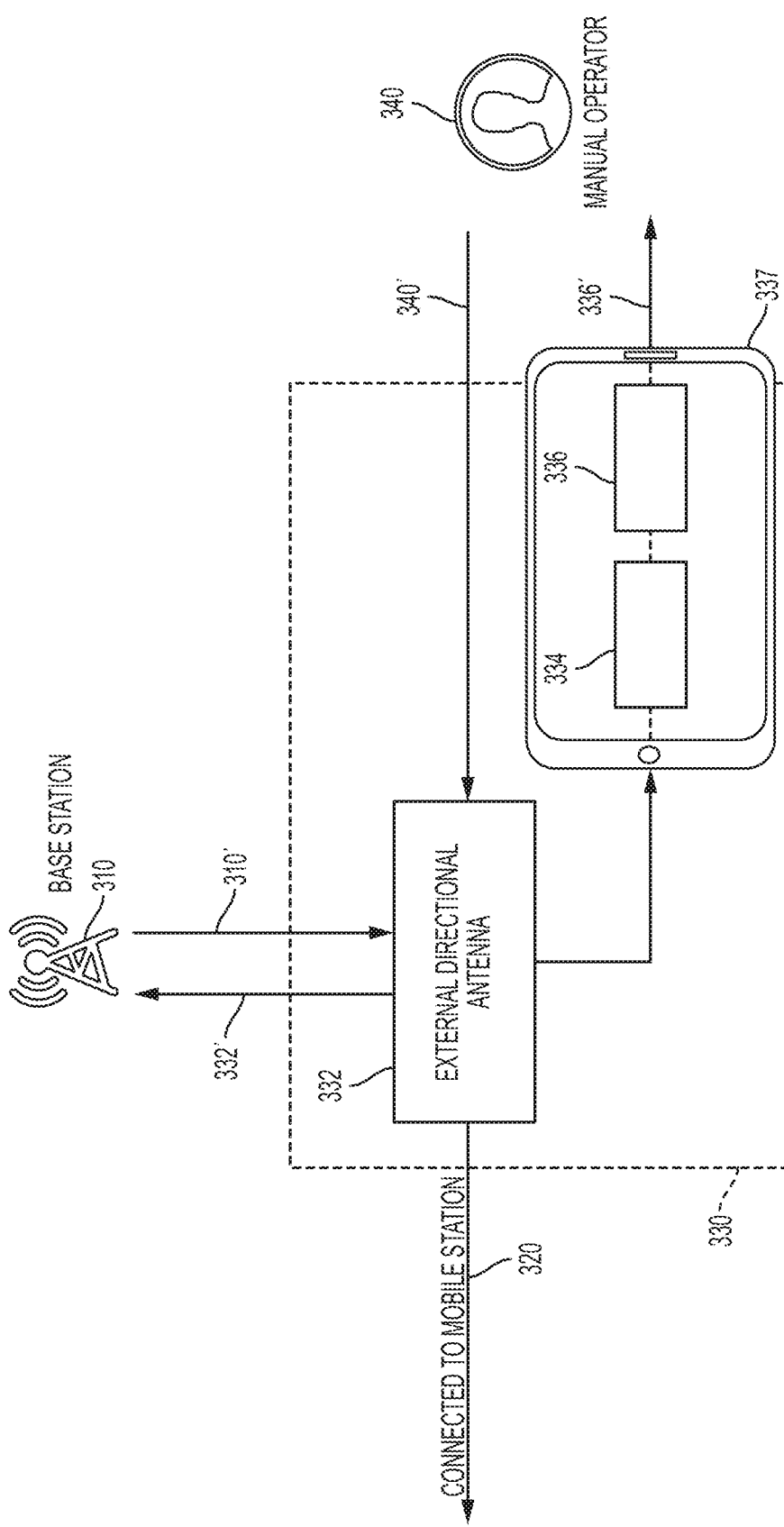
FIG. 3 is a sub-system level schematic of a configuration of a signal measurement and feedback system.

FIG. 3 illustrates a simple implementation of the signal measurement and feedback system 330. Similar to the embodiment described with FIG. 2, signals from the external directional antenna 332 are transmitted 332', e.g., by a hardwire connection, to the mobile station 320 and then wirelessly transmitted to the base station 310, with power level feedback 310' relayed back to the directional antenna in a power control loop. In this configuration, the external directional antenna is directly manually adjustable through three degrees of movement by a manual operator 340.

The remaining subsystems disclosed in FIG. 2 are, in this configuration, implementable in a mobile computing device such as a tablet, smartphone or mobile computing device 337. The mobile computing device 337 is configurable to receive as a line in the power level signal detected, from the external directional antenna 332, and then implements full signal conditioning functionality 334 as well as a customized feedback indication 336 utilizing any permutation of the use of the native screen display, speaker, vibrator element or other output on the mobile computing device 337, in order to communicate the power level of the external directional antenna 332 to the manual operator 340.

Once the manual operator 340 observes the audio, visual or tactile response 336' from the mobile computing device 337, the operator can then directly alter the orientation 340' of the external directional antenna 332 manually by moving the antenna through a range of motion in order to attempt to improve the indicated signal quality.

Figure 4:
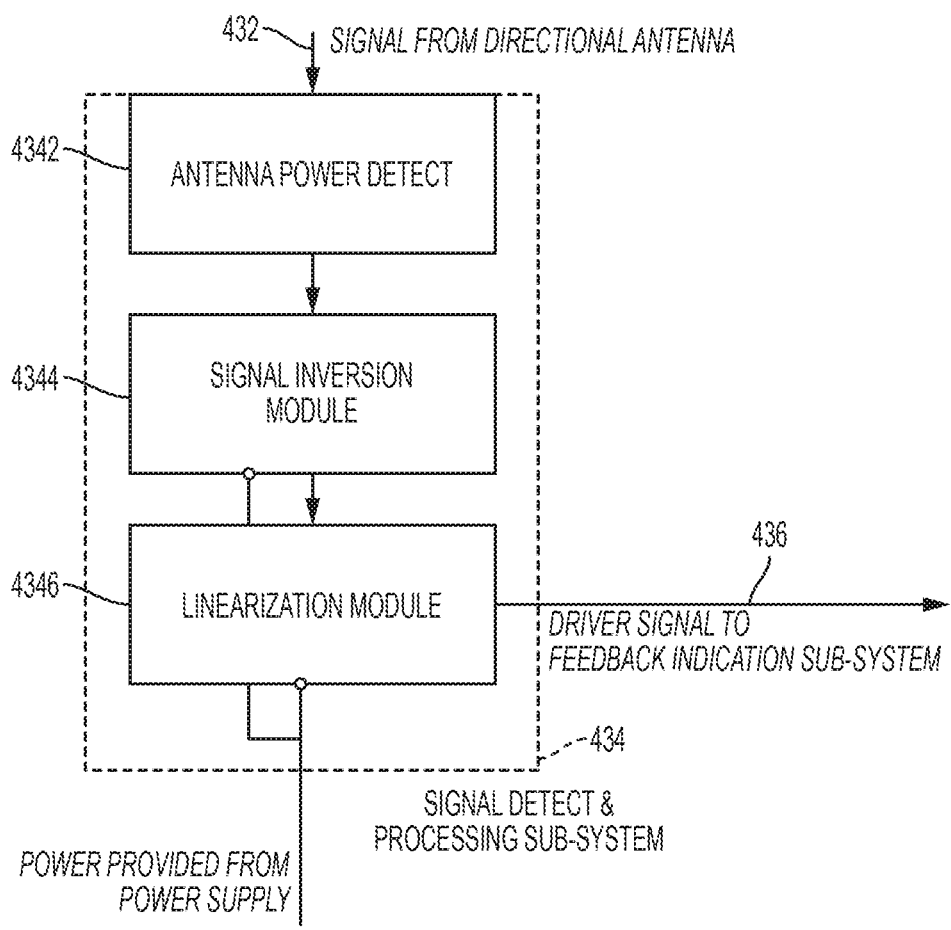
FIG. 4 is a diagram of a functional schematic of signal conditioning sub-system.

FIG. 4 discloses a functional schematic of the signal detect and processing subsystem 434. Antenna power detector 4342 can be physically located close enough to the directional antenna 432 for directional coupling. The measured signal is fed into the signal inversion module 4344. Multiple implementations exist to detect antenna power. One mechanism of implementation is to use a directional coupler and power detector to measure the conducted power being fed to the directional antenna 432.

The signal inversion module 4344 receives the signal from antenna power detector 4342, and provides line out or software output to linearization module 4346. The module inverts the input signal from the antenna power detector 4342 such that stronger the incident signal, the lower the power of the output signal fed to the linearization module 4346. The signal inversion module 4344 is an algorithm implementable as a hardware or software module, either inside the device or running on an external, connected mobile computing device such as a portable tablet, computer or smartphone.

In the event that the range of output from the inversion algorithm of signal inversion module is nonlinear then the linearization module implements an algorithm to ensure the response is linearized and normalized so that output signal driving feedback indicators can vary linearly. Where required, the linearization module 4346 receives as input the signal from signal inversion module 4344, and provides line out or software output to the feedback indication subsystem 436. The linearization module 4346 is an algorithm implementable as a hardware or software module, either inside device or running on an external, connected mobile computing device such as a portable tablet, computer or smartphone.

Figure 5:
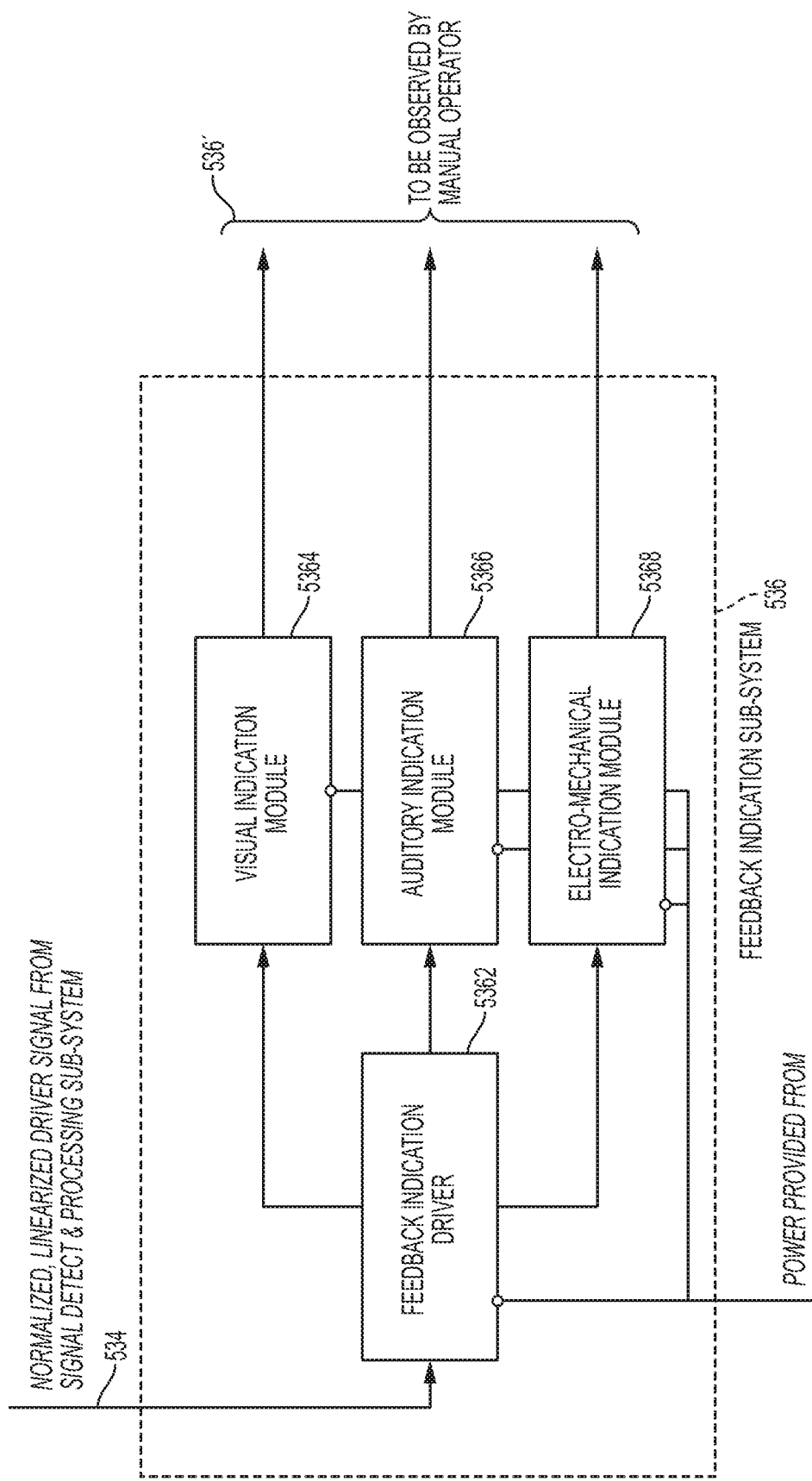
FIG. 5 is a diagram of a functional schematic of feedback indication sub-system.

FIG. 5 details the components comprising a functional schematic of the feedback indication subsystem 536. The system receives as input a normalized, linearized signal from the signal detect and processing subsystem 534 wherein a driver and one or more indicator modules provide feedback 536' to a manual operator 540.

The feedback indication driver receives signal from signal detect and processing subsystem 534, and provides hardware specific instructions to drive one or more visual indicator module 5364, auditory indicator module 5366 or electro-mechanical indicator module 5368 components. Each line output of the feedback indication driver 5362 is specifically tailored to appropriately drive the particular hardware or software comprising the respective feedback module. The feedback indication driver 5362 is an algorithm implementable as a hardware or software module, either inside device or running on an external, connected mobile computing device such as a portable tablet, computer or smartphone.

The visual indicator module 5364 receives a driver signal from the feedback indication driver 5362 and in turn provides a visual display of signal strength, specifically displaying a representation of the conditioned power level signal generated by the processing subsystem 534. If the visual indicator module 5364 is implemented in hardware components, then one configuration of the module may comprise a series of LEDs arranged in a bar graph fashion. Other visual configurations may vary in number of lighting elements, element shape, color and visual arrangement. Visual components can be mounted or otherwise viewable on an exterior surface of the device housing.

The auditory indicator module 5366 receives a driver signal from the feedback indication driver 5362 and in turn provides an auditory representation of the conditioned power level signal generated by the processing subsystem 534. Module may be implemented either inside the device, for instance as an amplifier-speaker pair, or via an external, connected mobile computing device, such as a portable tablet, computer or smartphone or any other external device or hardware with a speaker that can be controlled by the driver signal from feedback indication driver 5362. Audio indication of antenna power level may take the form of a varying speaker frequency, varying audible beats per minute or any other audio scheme intuitively understood by the manual operator 540. If auditory indicator module 5366, which provides feedback, is internal, then the module can be mounted such that the audio signal is audible and recognizable unambiguously by the manual operator 540.

Electro-mechanical indicator module 5368 Receives driver signal from the feedback indication driver 5362 and provides an electromechanical response denotative of signal strength, specifically driven by the normalized, inverted signal form the signal detect and processing subsystem 534.

The electromechanical response may include actuators producing one or more of vibrational, radial and translational movement. In one configuration of the electro-mechanical indicator module 5368, the module is implemented via the feedback indication driver 5362 driving the vibration element in an external third party portable computer which is also implementing the visual indicator module 5364, and auditory indicator module 5366. Where the electro-mechanical elements are internal to the device, they should be mounted to housing of the device such that element vibration is translated to vibration of entire device and recognized unambiguously by a manual operator 540.

Figure 6:
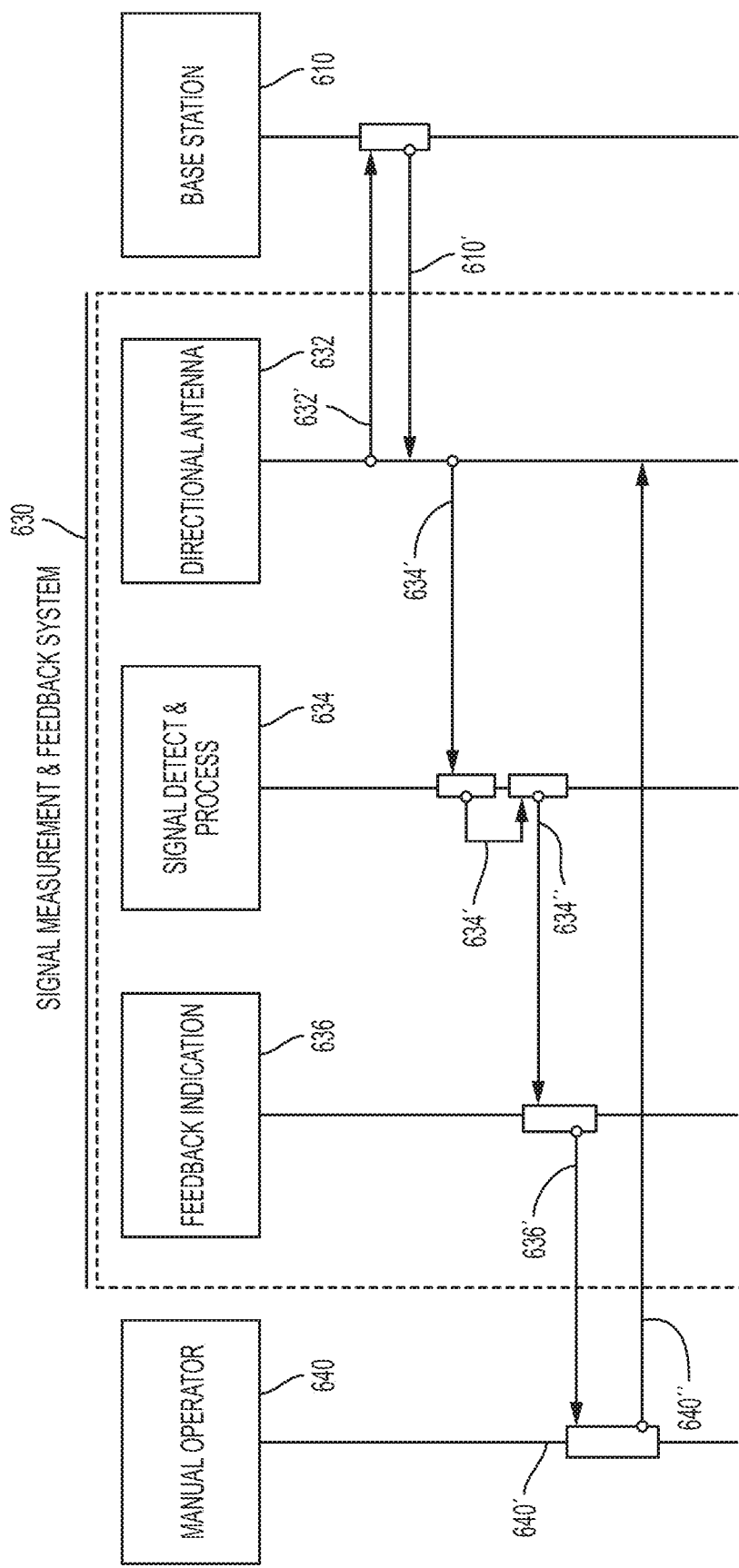
FIG. 6 is a diagram of a sequence diagram demonstrating manual feedback and adjustment configuration in operation as an operator-antenna reorientation loop.

FIG. 6 demonstrates the sequence of signals involved in a single cycle of the operator-antenna reorientation loop, involving the interaction between the signal measurement and feedback system, a manual operator and the base station.

A directional antenna 632, as part of a power level control loop, transmits data at its current orientation 632' to the base station 610. The base station 610 senses the level the amplitude of the incident signals must be reduced to and provides power level feedback 610' back to the directional antenna 632. The directional antenna 632 imparts a signal constituting measured signal strength 632" for the signal detector and processor subsystem 634 to invert the incident signal 634' and then generate the linearized, normalized signal 634" for interpretation by the feedback indication subsystem 636.

The feedback indication subsystem 636, using internal drivers, maps the linearized or normalized signal 634" onto one or more visual, audio, electro-mechanical feedback indicators 636' to alert a manual operator 640 of the present suitability of the directional antenna's current orientation. At this point, the manual operator 640 must at their own discretion judge whether the signal strength is deemed sufficient and if not, provide input 640' to physically reposition the directional antenna orientation 640" with an aim to improve the electro-mechanical feedback indicators 636' which indicate a power signal.

Next, at this new orientation, the directional antenna 632 transmits data at an updated current orientation 632' to the base station 610, which, in turn, provides an updated power level feedback 610' and so the operator-antenna control loop repeats until the manual operator 640 is satisfied with the feedback received from the electro-mechanical feedback indicators 636'.

Figure 7:
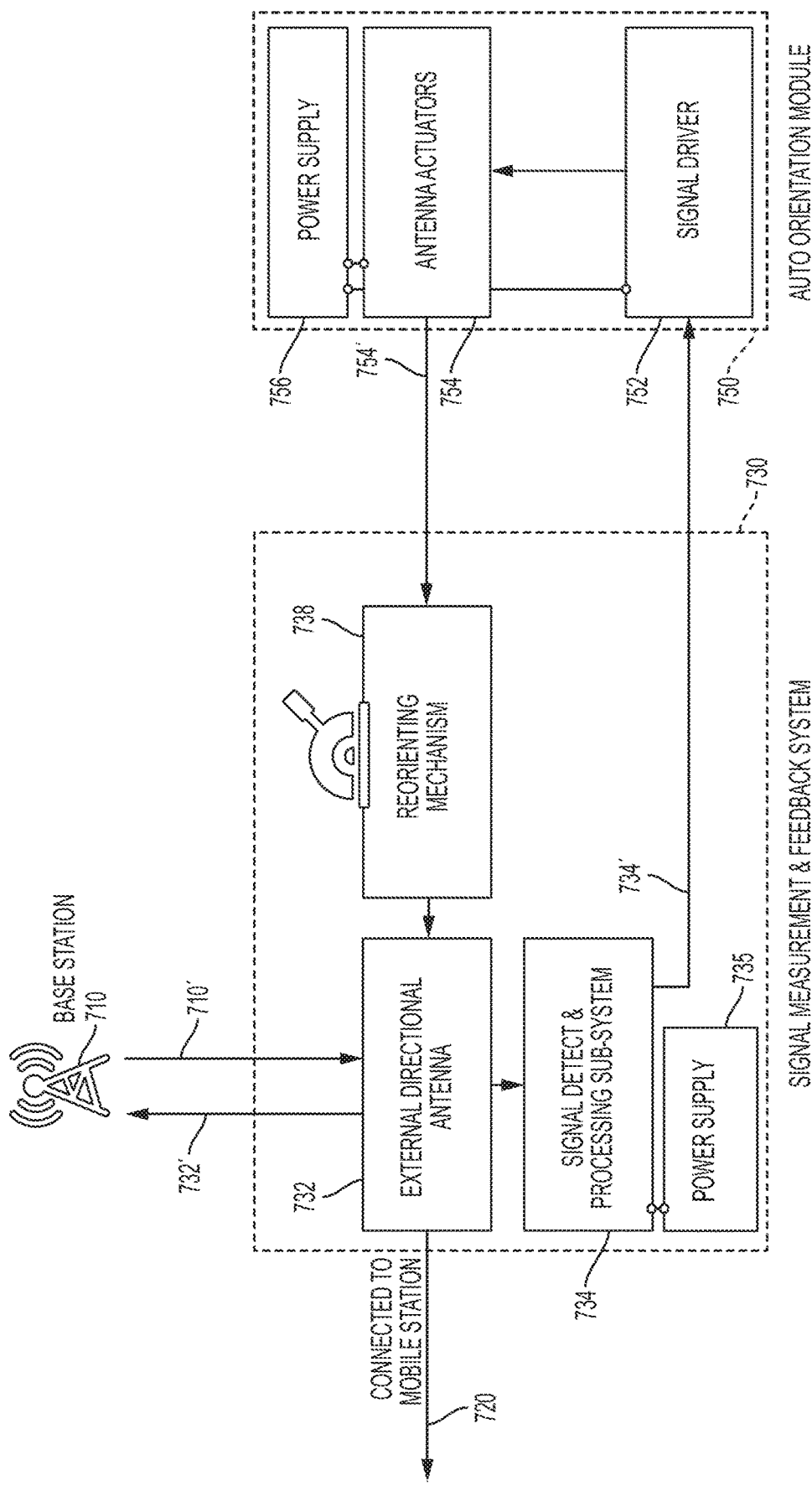
FIG. 7 is a diagram of a sub-system level schematic of automatic feedback and adjustment configuration detailing signal measurement and feedback system.

FIG. 7 details the auto-orientation scheme described in FIG. 1B in greater detail considering each separate subsystem which comprises the signal measurement and feedback system 730 when configured with an auto-orientation module 750 to actively, automatically evaluate and adjust external directional antenna orientation.

The base station 710 provides feedback on incident signal power level 710' to the signal measurement and feedback system 730.

A key aspect of the disclosed system is the directional antenna 732, which is electrically connected via signal line cord to mobile station 720 as an external directional antenna. The directional antenna 732 may be any type of directional antenna, comprising a signal line cord engaged with a radiating element which radiates or receives greater power in a specific, configurable direction allowing for increased performance and reduced interference from unwanted sources. Mechanically the radiating element is fixed to an articulated joint able to move radially through one or more degrees of freedom. The other end of the antenna is able to move with freedom to point in any direction articulated joint and mechanical constraints permit. The directional antenna 732 therefore functions as the antenna of the mobile station 720, transmitting and receiving data signals to and from the base station to mobile station 732' and receiving updated incident signal power level 710' feedback from mobile station 720 as part of a power control loop.

The signal from the directional antenna 732 is detected and processed by the signal detector and processor subsystem 734. In one configuration, power signal is detected by a directional coupler, which imparts a signal which can then be conditioned by way of inversion and normalization, where required, into a form which can readily be used by auto-orientation module 750. One configuration implements the signal processing 734 functionality via a microcontroller having a set of predefined algorithms to implement each processing module.

A power supply 735 being either internal battery or lead from externally power supply provides DC power into the signal detector and processor subsystem 734.

Some configurations involving for instance automated antenna control particularly for control of a large directional antenna, may utilize mechanical assistance in providing additional turning force or accuracy, to physically reorient the directional antenna 732. If used, such a reorientation mechanism 738 allows antenna actuators 754 to physically drive one or more degrees of freedom in the reorienting the external directional antenna. The reorienting mechanism may comprise components including gears, levers, hydraulics, pneumatics or other assistive facility for antenna actuators 754 reorient the directional antenna 732.

An auto-orientation module 750 can replace and automate the role of the manual operator, by mathematically translating the inverted, linearized signal 734' it receives from the signal measurement and feedback system 730 into a control scheme to drive antenna actuators 754 to reorient the directional antenna 732 and reposition the antenna.

The signal driver 752 implements an algorithm which maps the measured linearized signal 734' from signal measurement and feedback system 730 to an updated target orientation according to a pre-defined signal search pattern. Given the target orientation, the algorithm then generates time-variant driver signals to drive one or more antenna actuators 754 from current orientation to the target orientation. One implementation of signal driver 752 is via a microcontroller mounted in auto-orientation module 750 and powered by power supply 756. The system and algorithm can operate independent of the distance between the base station and the mobile station. For example, the antenna can be rotated in a full circle to determine which orientation has the best feedback. Thereafter the antenna is positioned at the location with the best feedback.

One or more antenna actuators 754 receive driver signals from the signal driver 752 and impart movement either to directional antenna 732 or in some implementations, via a reorientation mechanism 738. In so doing, the antenna actuators are able to cause the orientation of the directional antenna 732 to physically realign from current to target orientation, as required by signal driver 752. A power supply 756 such as a battery or a lead from externally power supply provides DC power into signal driver 752 and antenna actuators 754.

Figure 8:
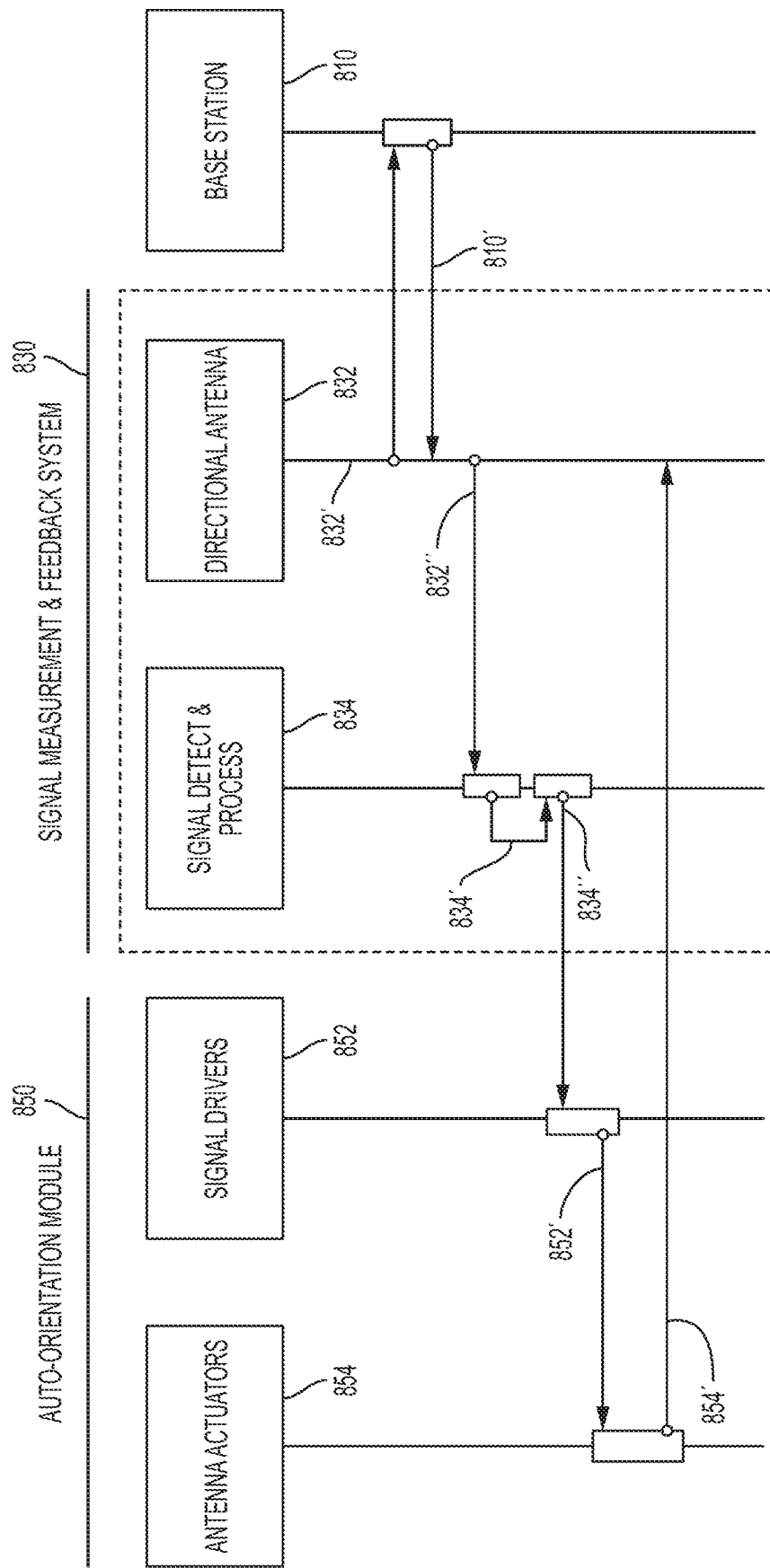
FIG. 8 is a sequence diagram demonstrating auto feedback and adjustment configuration in operation as an operator-antenna reorientation loop.

FIG. 8 illustrates the sequence of signals involved in a single cycle of the automated antenna reorientation loop, involving the interaction between the signal measurement and feedback system 830, the auto-orientation module 850 and the base station 810. A directional antenna 832, as part of a power level control loop, is configurable to transmit data at its current orientation 832' to the base station 810. The base station 810 senses the level the amplitude of the incident signals must be reduced to and provides power level feedback 810' back to the directional antenna 832. The directional antenna 832 imparts a signal constituting measured signal strength 832" for the signal detect and process subsystem 834 to invert the incident signal 834' and then generate the linearized, conditioned signal 834" for interpretation by the signal driver module 852. The signal driver module 852 implements a pre-configured signal search algorithm and generates a new target antenna orientation. A time-variant control signal 852' is sent to the antenna actuators 854. Driven by this control signal, the antenna actuators 854 provide an instruction 854' to physically reposition the directional antenna orientation from current position to the new target antenna orientation.

Now at this new orientation, the directional antenna 832 transmits data at the new orientation 832' to the base station 810, which, in turn, provides an updated power level feedback 810' and so the auto antenna reorientation loop repeats. Automated antenna reorientation loop can continually reorient the antenna until the signal search algorithm in signal driver module 852 achieves a level of signal quality which exceeds a predefined relative or absolute threshold.

Figure 9:
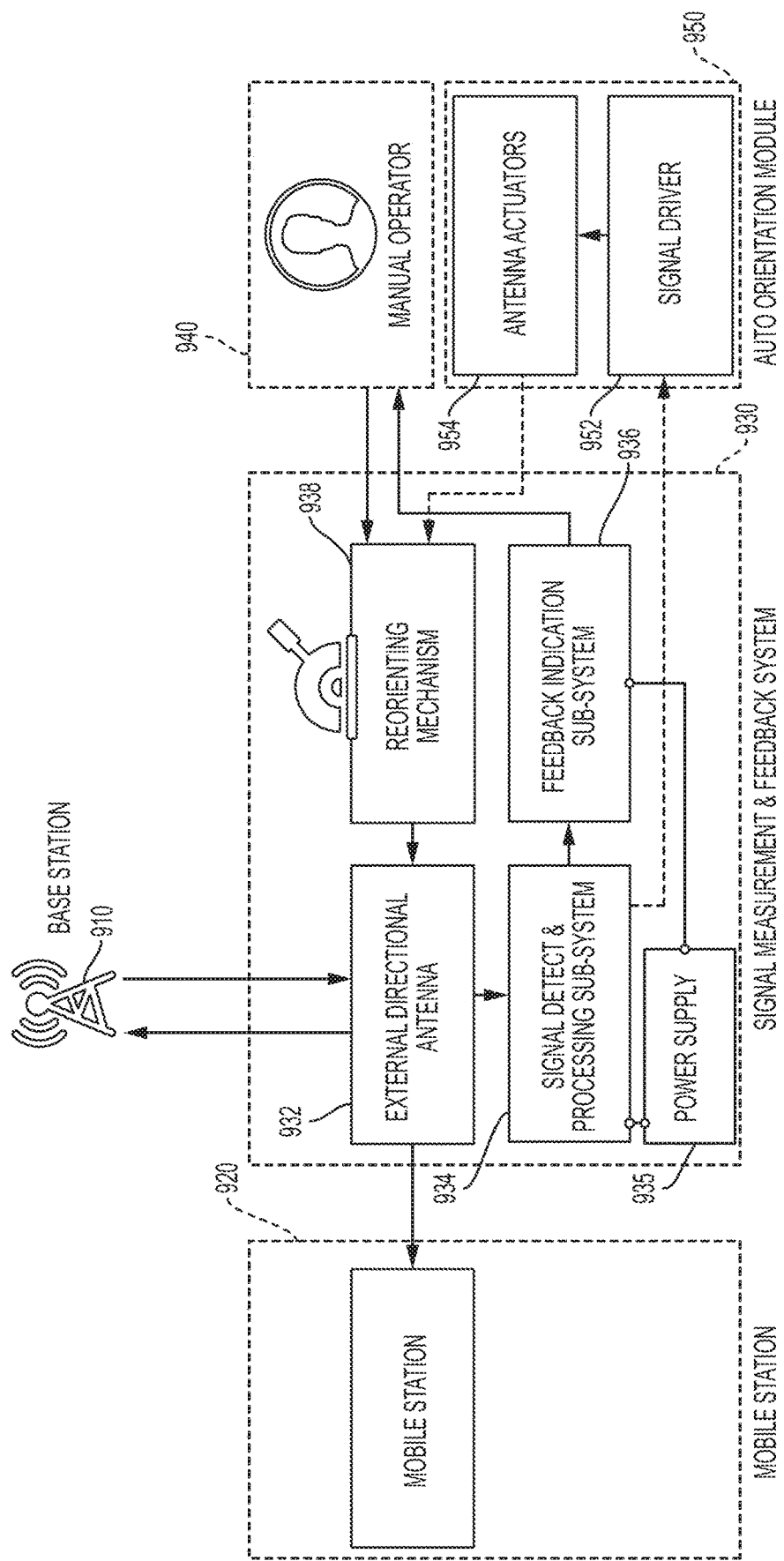
FIG. 9 is a sub-system level schematic of dual control system comprising both manual and automatic adjustment of directional antenna.

A configuration exists where both manual and automatic reorientation of the directional antenna is possible, as illustrated in FIG. 9. Most sub-systems and modules can be similar to those in configurations disclosed in FIG. 2 and FIG. 7. A base station 910 is in communication via the signal measurement and feedback system 930 with a mobile station 920. The signal measurement and feedback system 930 includes an external directional antenna 932, a reorienting mechanism 938, a signal detect and processing sub-system 934, a feedback indication sub-system 936, and a power supply 935. A key point of difference in this hybrid configuration is that the normalized, conditioned signal output form the signal detect and processing sub-system 934 feeds into both the feedback indication sub-system 936 which in turn is relayed to the manual operator 940, as well as also routing to the auto orientation module 950. The auto orientation module 950 can include a signal driver 952, and antenna actuators 954. One configuration of this hybrid approach may allow the manual operator 940 to control a switch between auto and manual control.

In at least some configurations, the steering is on the order of approximately 10 times slower than the behavior of the control loop. In practice, a human or automatic steering method could take at least 2-5 seconds for a complete rotation.

The systems and methods according to aspects of the disclosed subject matter may utilize a variety of computer and computing systems, communications devices, networks and/or digital/logic devices for operation. Each may, in turn, be configurable to utilize a suitable computing device that can be manufactured with, loaded with and/or fetch from some storage device, and then execute, instructions that cause the computing device to perform a method according to aspects of the disclosed subject matter.

A computing device can include without limitation a mobile user device such as a mobile phone, a smart phone and a cellular phone, a personal digital assistant ("PDA"), such as an Android device, iPhone®, a tablet, a laptop and the like. In at least some configurations, a user can execute a browser application over a network, such as the Internet, to view and interact with digital content, such as screen displays. A display includes, for example, an interface that allows a visual presentation of data from a computing device. Access could be over or partially over other forms of computing and/or communications networks. A user may access a web browser, e.g., to provide access to applications and data and other content located on a website or a webpage of a website.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Certain embodiments of the disclosed subject matter may be described for illustrative purposes as steps of a method that may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at sometimes be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

Additionally, a communication system of the disclosure comprises: a sensor as disclosed; a server computer system; a measurement module on the server computer system for permitting the transmission of a measurement from a detection device over a network; at least one of an API (application program interface) engine connected to at least one of the detection device to create a message about the measurement and transmit the message over an API integrated network to a recipient having a predetermined recipient user name, an SMS (short message service) engine connected to at least one of the system for detecting physiological parameters and the detection device to create an SMS message about the measurement and transmit the SMS message over a network to a recipient device having a predetermined measurement recipient telephone number, and an email engine connected to at least one of the detection device to create an email message about the measurement and transmit the email message over the network to a recipient email having a predetermined recipient email address. Communications capabilities also include the capability to communicate and display relevant performance information to the user, and support both ANT+ and Bluetooth Smart wireless communications. A storing module on the server computer system for storing the measurement in a detection device server database can also be provided. In some system configurations, the detection device is connectable to the server computer system over at least one of a mobile phone network and an Internet network, and a browser on the measurement recipient electronic device is used to retrieve an interface on the server computer system. In still other configurations, the system further comprising: an interface on the server computer system, the interface being retrievable by an application on the mobile device. Additionally, the server computer system can be configured such that it is connectable over a cellular phone network to receive a response from the measurement recipient mobile device. The system can further comprise: a downloadable application residing on the measurement recipient mobile device, the downloadable application transmitting the response and a measurement recipient phone number ID over the cellular phone network to the server computer system, the server computer system utilizing the measurement recipient phone number ID to associate the response with the SMS measurement. Additionally, the system can be configured to comprise: a transmissions module that transmits the measurement over a network other than the cellular phone SMS network to a measurement recipient user computer system, in parallel with the measurement that is sent over the cellular phone SMS network.

EXAMPLE

A power level of 23 dBm at 787 MHz from a data router's transmission of electromagnetic energy is conducted from the data router to an attached antenna according to the disclosure. The measurement circuit in the antenna measures that conducted power prior to it being radiated by the antenna element. Based on the measured power the antenna generates an instruction to, for example, light a subset of a plurality of LEDs on a visual display. Thus, a power of 23 dBm might result in zero LEDs being illuminated, while a power below 10 dBm could result in all of the LEDs being illuminated.

As will be appreciated by those skilled in the art, the number of LEDs (or actual feedback mechanism) can vary. The dynamic range of the power control loop could go from 40 dBm to +33 dBm. For a given band (which determines the maximum transmit power) a linear interpolation between a high power (max-6 dB) and a low end usable power (say 0 dBm) could be employed. The exact power vs. feedback value relationship could be established empirically.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for improving signal quality, the system comprising:
    an antenna power level detector in communication with a directional antenna, the antenna power level detector configured to detect a signal strength, wherein the detected signal strength is correlated to an orientation of the directional antenna at the time the signal strength is detected; and
    a signal inverter configured to generate a conditioned signal based at least in part on the detected signal strength, wherein the system is configured to communicate a reorientation instruction for reorientation of the directional antenna based at least in part on the conditioned signal;
    wherein the system is configured to communicate the reorientation instruction to a user.

2. The system of claim 1, further comprising an automatic actuator subsystem configured to reorient the directional antenna in response to the communicated reorientation instruction.

3. The system of claim 2, wherein the automatic actuator subsystem comprises at least one drive actuator configured to reorient the directional antenna, and wherein the system is configured to control the automatic actuator subsystem using a closed loop control system.

4. The system of claim 1, wherein the system is configured to communicate one or more reorientation instructions until the detected signal strength reaches a threshold value.

5. The system of claim 1, wherein the system is configured to be connected to a mobile computing device.

6. The system of claim 1, wherein the antenna power level detector is configured to detect the signal strength using a directional coupler.

7. The system of claim 1, wherein the antenna power level detector is configured to detect the signal strength based on signal power level feedback provided by a base station in communication with the directional antenna.

8. A system for improving signal quality when used in a cellular transmit power control loop controlled by a cellular base station, the system comprising:
    an external directional antenna connected to a desktop cellular router;
    an antenna power level detector in communication with the external directional antenna, the antenna power level detector configured to detect a signal strength, wherein the detected signal strength is correlated to an orientation of the external directional antenna at a time the signal strength is detected; and
    a signal inverter configured to generate a conditioned signal based at least in part on the detected signal strength, wherein the system is configured to communicate a reorientation instruction to a user for reorientation of the external directional antenna based at least in part on the conditioned signal.

9. The system of claim 8, further comprising an automatic actuator subsystem configured to reorient the external directional antenna in response to the communicated reorientation instruction.

10. The system of claim 9, wherein the automatic actuator subsystem comprises at least one drive actuator configured to reorient the external directional antenna, and wherein the system is configured to control the automatic actuator subsystem using a closed loop control system.

11. The system of claim 8, wherein the system is configured to communicate one or more reorientation instructions until the detected signal strength reaches a threshold value.

12. The system of claim 8, wherein the system is configured to be connected to a mobile computing device.

13. A method for improving signal quality of a directional antenna when used in a transmit power control loop, the method comprising:
    detecting a signal strength from a directional antenna, wherein the detected signal strength is correlated to an orientation of the directional antenna at the time the signal strength is detected;
    generating a conditioned signal from the detected signal strength, generating a conditioned signal comprising inverting the detected signal strength via a signal inverter; and
    communicating a reorientation decision for movement of the directional antenna based at least in part on the conditioned signal and instructing a user to move the directional antenna.

14. The method of claim 13, further comprising automatically reorienting the directional antenna via an actuator subsystem.

15. The method of claim 13, wherein the steps of detecting, generating, and communicating are repeated until the detected signal strength reaches a threshold value.

16. The method of claim 13, further comprising connecting the directional antenna to a mobile computing device.

\* \* \* \* \*